May 18, 1965 G. W. YEP 3,183,566
CLAMP FOR SECURING HAWSERS AND THE LIKE
Filed Nov. 12, 1963 4 Sheets-Sheet 1

INVENTOR.
George W. Yep,
BY Paul & Paul
ATTORNEYS.

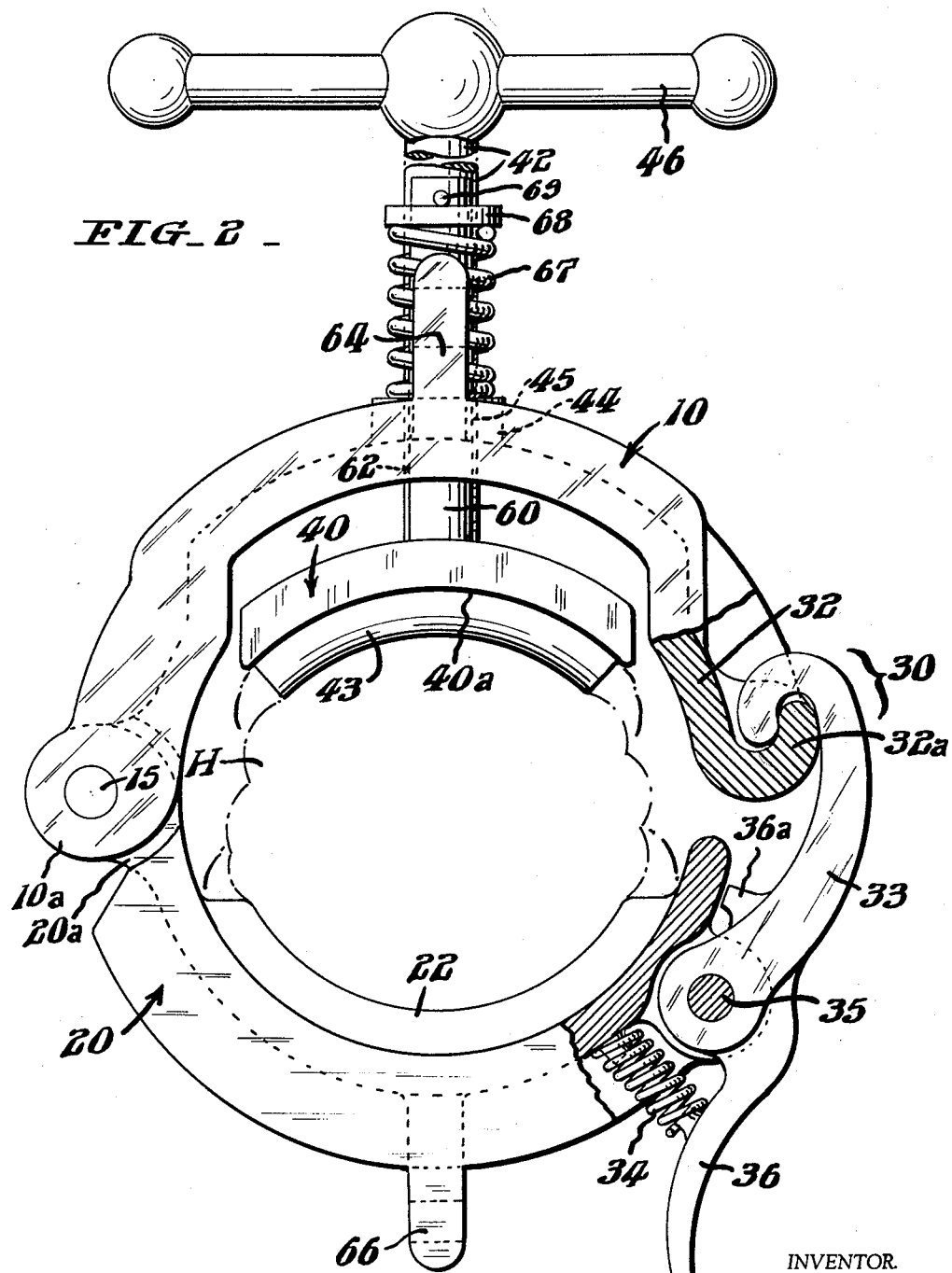

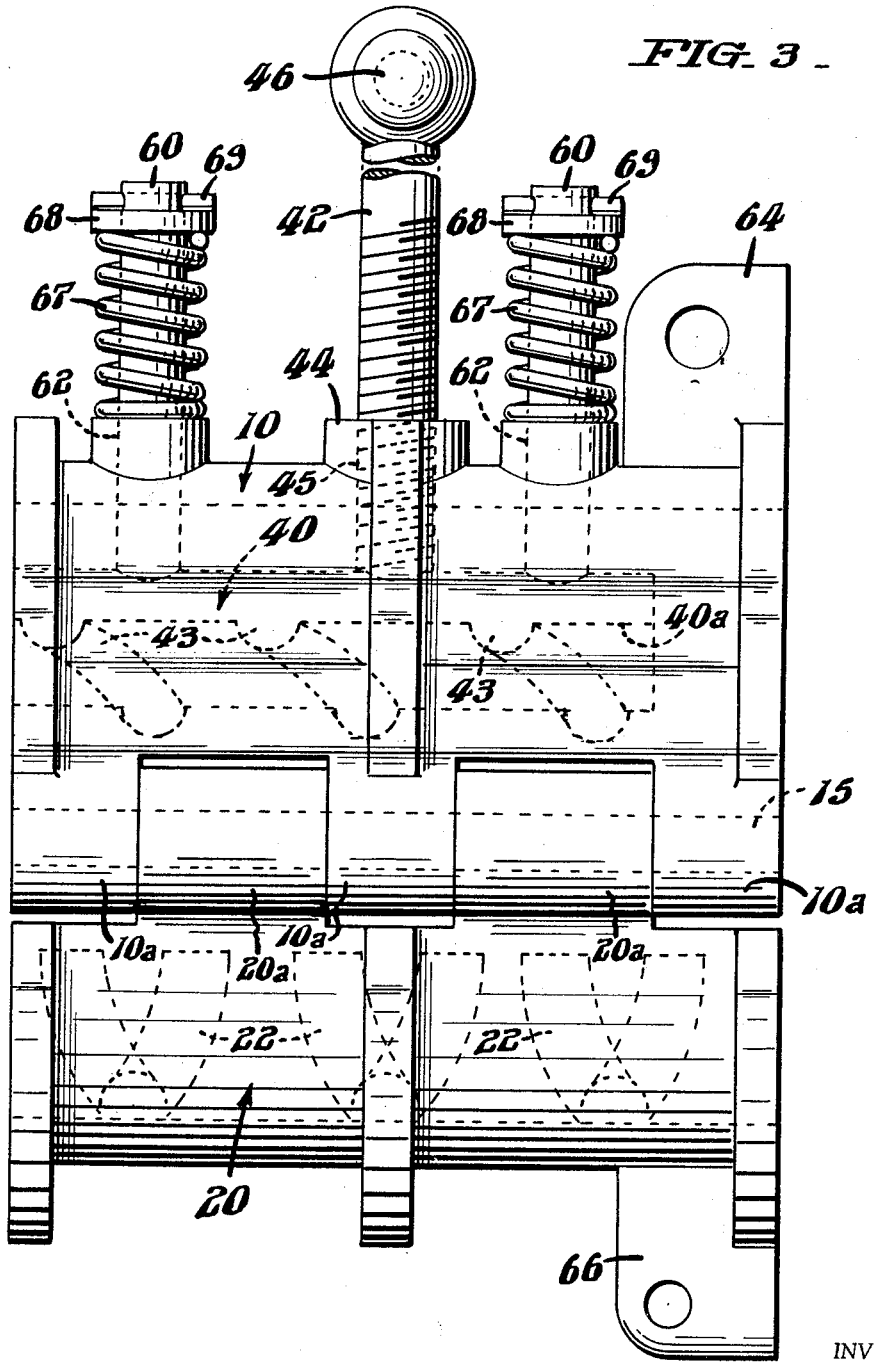

May 18, 1965 G. W. YEP 3,183,566
CLAMP FOR SECURING HAWSERS AND THE LIKE
Filed Nov. 12, 1963 4 Sheets-Sheet 4
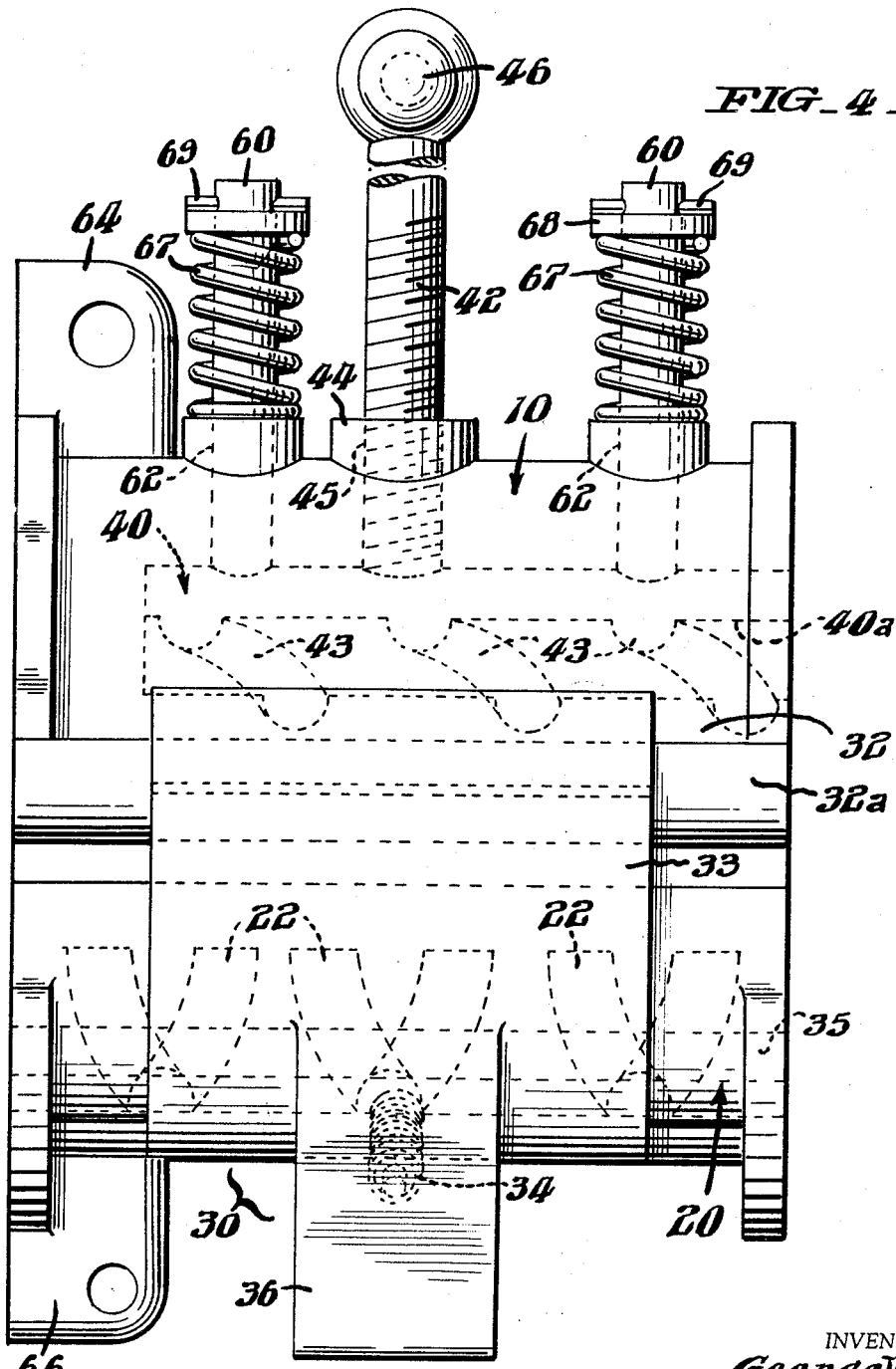
FIG_4_
INVENTOR.
George W. Yep,
BY
Paul & Paul
ATTORNEYS.

United States Patent Office 3,183,566
Patented May 18, 1965

3,183,566
CLAMP FOR SECURING HAWSERS AND THE LIKE
George W. Yep, 8123 Frankford Ave., Philadelphia, Pa.
Filed Nov. 12, 1963, Ser. No. 322,748
3 Claims. (Cl. 24—125)

This invention relates to a clamping apparatus for temporarily securing hawsers, cables and the like while they are subjected to heavy tension.

It is customary practice in mooring ships to use a short length of small diameter rope, commonly referred to as a stopper, to temporarily hold a heavy hawser or cable attached at one end to the pier or dock and drawn tight through a hawsehole by a winch on the ship. The rope stopper, tied to a bit or other stationary object on the ship, is manually tied to the tensioned hawser while the hawser is still held by the winch. Then, while the hawser is thrown off the winch and until it is looped around usually a pair of bitts on the dock, the rope stopper holds and takes the full strain on the hawser. During this brief interval, the stopper must be held very tightly by a crew member or the hawser will slip and, particularly in the case where there is additional strain on the hawser other than merely its own weight, the rope stopper is often incapable of holding the hawser. Occasionally, the stopper breaks allowing the hawser to run freely out the hawsehole and endangering crew members in the work area.

Therefore, it is the primary object of this invention to provide a hawser clamping apparatus composed of metal whereby a mooring line and the like can be quickly secured without any danger of the line loosening and requiring retensioning or endangering the crew by the line moving out of the hawsehole.

In addition to the single specific use described above, frequently in construction work and other occupations employing ropes or cables, a rope clamping device can be advantageously employed.

It is another object of this invention to provide a strong hawser clamping apparatus which can quickly and easily be placed in operation by a single person. Further, the apparatus must be light in weight and relatively inexpensive to manufacture.

These and other attendant advantages of this invention will become more apparent from the description set forth hereinbelow and from the attached drawings, wherein:

FIG. 2 is an end elevational view of the clamp according to FIG. 1;

FIG. 3 is a side elevational view of the clamp seen from the left as shown in FIG. 2;

FIG. 4 is a side elevational view of the clamp seen from the right as shown in FIG. 2;

Figure 1:
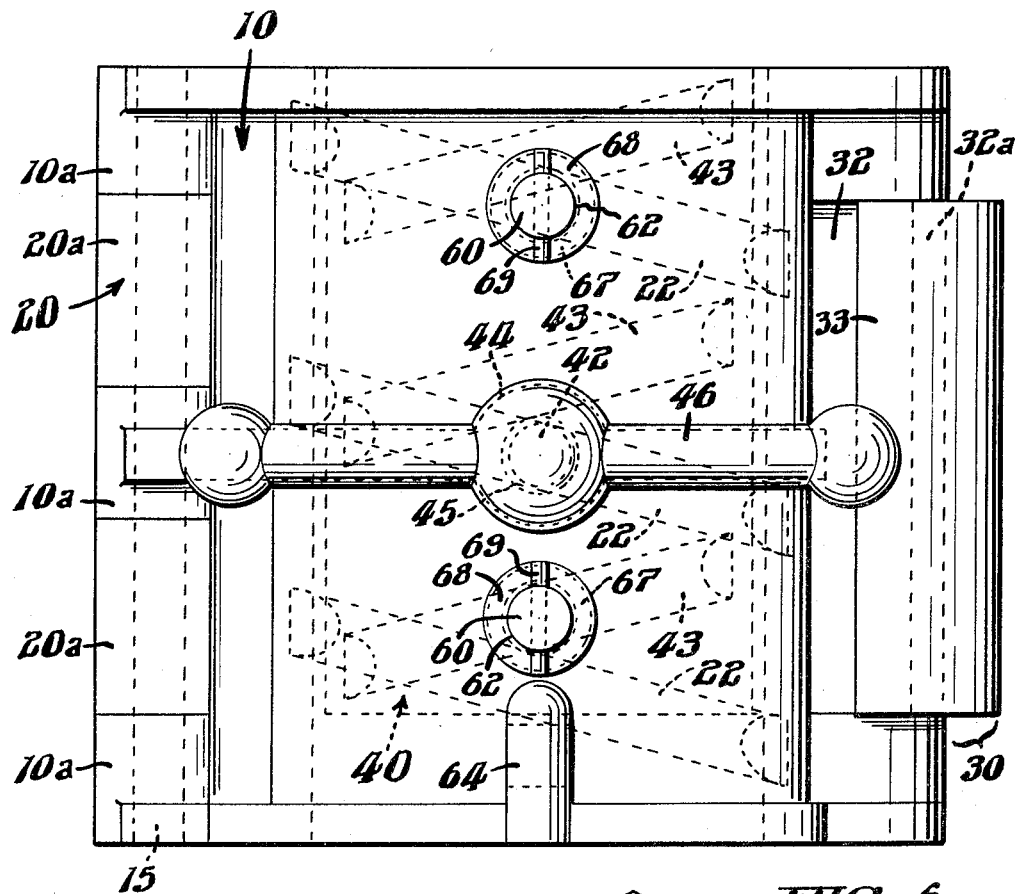
FIG. 1 is a plan view of one form of the hawser clamp of this invention.

In the description of this invention, the words "hawser" and "cable" are used to identify and include any type of rope or line produced from fiber or metallic wire and the word "stopper," although usually limited to a rope for holding ship mooring lines, includes any device for holding any type of line for any purpose.

The following description is directed to the specific form of the invention illustrated in the drawings and is not intended to limit the scope of the invention itself which may be practiced in a wide variety of forms and arrangements.

Referring, preliminarily, to FIG. 2 of the drawings, a preferred form of cable or rope clamping apparatus or stopper, according to the teaching of this invention, comprises substantially a three element structure which, when in operating position, encircles the hawser that is to be held. These elements of the stopper include a top, arcuately shaped, supporting member or plate 10, a bottom, arcuately shaped, supporting member or plate 20 pivotally joined to the top member and an arcuately shaped tensioning member 40 mounted for movement on one supporting member in a direction toward or away from the opposing supporting member.

Figure 5:
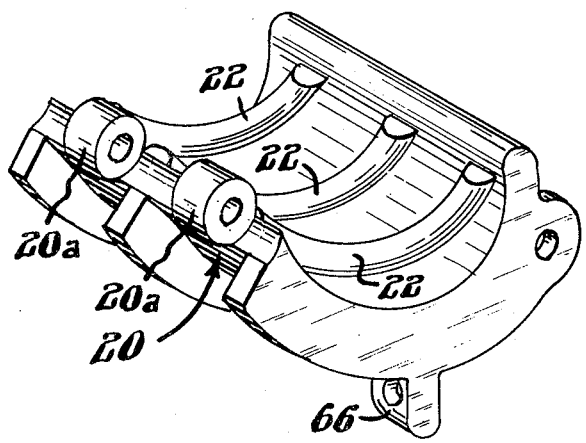
FIG. 5 is a perspective view of the bottom supporting plate of the clamp.

In greater detail, the stopper as shown in FIG. 2 includes an approximately arcuately or hemi-cylindrical shaped top supporting member or plate 10 having a plurality of hinge segments 10a located at one end and a lock retaining member 32 with a locking lip 32a at the opposite end. The lower, approximately arcuately shaped supporting member or plate 20 has, similarly, hinge segments 20a (shown in FIGS. 3 and 5) at one end and a latch 33 operating on a shaft 35 at the opposite end. In this form of the invention, hinge segments 10a and 20a extend substantially the entire axial length of the supporting members 10 and 20 so that the hinge will have sufficient strength to resist twisting and bending when subjected to heavy tension. A thumb release 36 with a cam 36a operates to swing the latch 33 away from the retaining member 32 and off lip 32a when the top and bottom plates 10, 20 are brought sufficiently close to each other. A spring 34 operates to press the thumb release and thereby the latch 33 in the direction of engagement with the retaining member 32. The locking mechanism comprising the structure identified above is generally identified by the numeral 30. In this form of the invention, the locking mechanism 30 extends at least one half of the total axial length of the supporting members 10 and 20 so that the mechanism will be strong enough to prevent the members from being pulled apart or twisted when the device is clamped onto a hawser or line subjected to heavy tension. A top securing stud 64 and lower securing stud 66 each having a bore extending therethrough are attached to the top plate 10 and bottom plate 20, respectively, so as to provide means for fastening the stopper to a stationary base. The supporting plates 10, 20 are preferably composed of a relatively light-weight but high strength metal.

The tensioning plate 40 has a rectangular, arcuate or hemi-cylindrical shape and is equipped with a plurality of hemispheric or oval shaped, friction bars 43 arranged along its inner or bearing surface 40a. A threaded shaft 42 is attached to the top surface of plate 40 in such a way as to allow shaft 42 to rotate in threads 45 provided in a bore 44 in the top supporting plate 10. When shaft 42 is rotated, tensioning plate 40 is moved closer to or away from the supporting plate 10. A pair of cylindrical positioning studs 60 are fixedly attached to the top surface of the tensioning plate 40 and extend through bores 62 in the top support member 10. The studs 60 are of sufficient length to continue to ride freely in bores 62 when the tensioning plate 40 is moved away from plate 10 the full clamping distance. Springs 67 are mounted on the shafts 60 against plate 10 at the bottom end held at the top by a retaining washer 68 and a stud 69 thereby tending to urge the tensioning plate 40 upward and closer to the supporting plate 10.

As further shown in FIG. 2, a hawser H or cable shown in dot and dash lines is held within the closed apparatus by the hemispheric or oval shaped friction bars 22 attached to the lower supporting plate 20 on the bottom and the friction bars 43 of tensioning plate 40 on the top. As shaft 42 is rotated in the downward direction by means of a handle 46, the tensioning plate presses the hawser tighter against the lower plate until the friction bars on the opposing surfaces firmly engage and thereby hold the cable.

In FIG. 1 of the drawings, the top supporting plate 10 is shown in greater detail. To the left of plate 10, hinge segments 10a securely attached to or formed integrally with plate 10 are mounted adjacent to hinge segments 20a attached or integrally formed with lower plate 20. The latch 33 is relatively long so as to accommodate the heavy loads placed on this member. Similarly, retaining lock member 32, located on the opposite end of the member, extends substantially the full length of the stopper thereby insuring that the locking mechanism will hold together even while heavy tension is directed on the device. The two positioning studs 60, together with their respective springs 67, washers 68 and studs 69 are also shown in this figure. The friction bars 43 attached to the friction plate 40 are shown in broken lines as the smaller friction bars. The larger friction bars 22 also shown in broken lines are attached to the lower support plate 20. Of course, other friction structure can be mounted on the bearing surfaces of the tensioning plate and bottom supporting member readily engage and grip the hawser. The hinge side of the stopper of this invention is shown in greater detail in FIG. 3. The hinges are held together by shaft 15 shown in broken lines.

Figure 6:
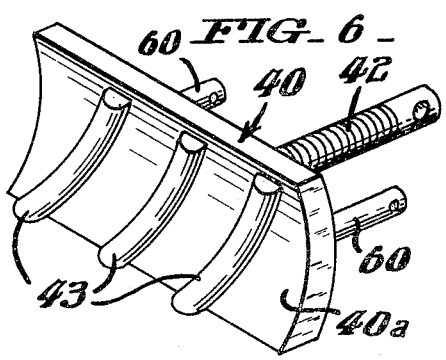
FIG. 6 is a perspective view of the tensioning plate of the clamp.

In FIG. 4, the locking mechanism 30 is shown in greater detail. The friction bars 22, 43 are also shown in broken lines. The lower support plate 20 is shown in perspective view in FIG. 5 and the tensioning plate, together with the threaded shaft and guiding studs, is shown in FIG. 6.

In operation, the stopper of this invention is first securely fastened to a stationary base of a ship such as a bitt or to an object implanted in the ground by means of a chain or cable fastened to the two studs 64 and 66 on the top and bottom plates. When the stopper is about to be placed on a hawser, the thumb release 36 is depressed with the two plates 10 and 20 held close together thereby allowing latch 33 to move away from retaining member 32. The supporting members 10, 20 are then swung apart, around shaft 15 and are placed and closed completely around the hawser H as shown in FIG. 2. Latch 33 is engaged in retaining member 32 over lip 32a and the tensioning plate moved downward upon hawser H. As handle 46 is turned, shaft 42 drives tensioning plate 40 toward the opposing plate 20 thereby compressing the hawser between the two plates. As handle 46 is turned further, the hawser becomes tightly locked within the stopper and any movement in either direction is prevented.

After the hawser has been otherwise secured or it is desired to remove the stopper from the hawser, the tensioning plate is withdrawn by rotating the handle and shaft with the springs 67 urging the plate upward until latch 33 can be removed from its retaining member. The stopper is then swung apart around shaft 15 and removed entirely from the hawser.

It should be understood that the cable clamping apparatus of this invention can be used to hold or secure either temporarily or on a permanent basis all types of cables and ropes under the usual circumstances. The clamp as described herein is easily placed in action and easily released.

Although this invention has been described with reference to specific forms and embodiments thereof, it will be apparent to those skilled in the art that various changes other than those referred to above may be made in the form of the apparatus, that equivalent elements may be substituted for those illustrated in the drawings, that parts may be reversed, and that certain features of the invention may be used to advantage independently of the use of other features, or within the spirit and scope of the invention as defined in the appended claims.

Having described my invention, I claim:

1. A clamp designed to hold hawsers or the like, said clamp comprising
    a pair of hemi-cylindrical body members pivotally joined together along one side in an axial direction, each of said members having an axial length at least as great as the arcuate length,
    hinge means pivotally joining said members and extending substantially the entire axial length of the members,
    latch means for connecting the free sides of the members, said latch means having an axial length at least as great as one-half of the axial length of the members,
    a hemi-cylindrical hawser tensioning member mounting adjacent one body member for movement within the area defined by the inner surfaces of the pair of body members, and
    means for progressively advancing the tensioning member away from the one supporting body member and into contact with the hawser whereby the hawser is securely clamped between the tensioning member and the opposing inner surface of the supporting member.

2. The clamp as defined in claim 1 further including hawser friction means fixedly mounted on the tensioning member and on the opposing supporting body member whereby the hawser is more readily clamped between the tensioning member and the opposing body member.

3. The clamp as defined in claim 1 further including at least one positioning stud fixedly mounted on the tensioning member and extending through a bore in the adjacent supporting member whereby movement of the tensioning member is limited to the directions toward and away from the opposing supporting member.

References Cited by the Examiner

UNITED STATES PATENTS

| | | | |
|---|---|---|---|
| 43,194 | 6/64 | Glasser | 269—129 |
| 480,810 | 8/92 | Downie | 24—125 |
| 688,772 | 12/01 | Eckard | 269—127 |
| 1,804,762 | 5/31 | Garden | 24—135 |
| 1,825,074 | 9/31 | Knapp | 24—135 |
| 2,148,284 | 2/39 | White | 114—199 |
| 2,198,262 | 4/40 | Bergan | 24—132 |
| 2,271,270 | 1/42 | McLearn | 24—125 |
| 2,462,969 | 3/49 | Holliday | 24—135 |
| 2,547,601 | 4/51 | Scheirer | 24—135 |
| 2,680,000 | 6/54 | Pulver | 269—129 |
| 2,848,785 | 8/58 | Bachli et al. | 269—129 |
| 3,091,489 | 5/63 | Vaughn | 292—259.69 |

FOREIGN PATENTS 591,349    4/25    France.

DONLEY J. STOCKING, *Primary Examiner.*